United States Patent
Foti

[19]

[11] Patent Number: 5,903,831
[45] Date of Patent: May 11, 1999

[54] SYSTEM AND METHOD OF PREVENTING FRAUDULENT CALL TRANSFERS IN A RADIO TELECOMMUNICATIONS NETWORK

[75] Inventor: George Foti, Dollard des Ormeaux, Canada

[73] Assignee: Telefonaktiebolaget LM Ericsson (publ), Stockholm, Sweden

[21] Appl. No.: 08/660,869

[22] Filed: Jun. 7, 1996

[51] Int. Cl.$^6$ ....................... H04Q 7/20
[52] U.S. Cl. .............. 455/410; 455/411; 455/565
[58] Field of Search .................. 455/410, 411, 455/435, 565, 432, 433

[56] References Cited

U.S. PATENT DOCUMENTS

| | | | |
|---|---|---|---|
| 4,955,049 | 9/1990 | Ghisler | 379/58 |
| 5,309,501 | 5/1994 | Kozik et al. | 455/433 |
| 5,335,278 | 8/1994 | Matchett et al. | 455/410 |
| 5,357,564 | 10/1994 | Gupta et al. | 379/188 |
| 5,392,335 | 2/1995 | Reeder | 379/67 |
| 5,420,908 | 5/1995 | Hodges et al. | 455/411 |
| 5,420,910 | 5/1995 | Rudokas et al. | 455/410 |
| 5,463,681 | 10/1995 | Vaios et al. | 379/189 |
| 5,473,671 | 12/1995 | Partridge, III | 455/417 |
| 5,541,977 | 7/1996 | Hodges et al. | 455/411 |
| 5,600,708 | 2/1997 | Meche et al. | 455/411 |

FOREIGN PATENT DOCUMENTS

| | | |
|---|---|---|
| 0 618 713 A2 | 10/1994 | European Pat. Off. . |
| 0 629 093 A1 | 12/1994 | European Pat. Off. . |

*Primary Examiner*—Wellington Chin
*Assistant Examiner*—Tilahun Gesesse
*Attorney, Agent, or Firm*—Smith & Danamraj, P.C.

[57] ABSTRACT

A system and method in a radio telecommunications network for preventing fraudulent call transfers by selectively restricting or disabling a call transfer immediate (CTR) feature is disclosed. The system includes a database of subscriber information which includes information relating to each subscriber's activated features and transfer-to numbers. The system also includes feature logic connected to the database for performing functions related to the activated features and for denying services related to features tat are not activated. CTR-disable logic is connected to the database and to the feature logic for selectively restricting or disabling the CTR feature when conditions indicative of fraudulent usage are detected. The method restricts or disables the CTR feature if the number of CTR call transfer requests exceeds a threshold number of requests within a predetermined time period. The method may also restrict or disable the CTR feature if the transfer-to telephone number included in the CTR call transfer request is not on a List of approved transfer-to telephone numbers. The CTR-disable logic may also restrict or disable the CTR feature if any two successive transfer requests occur too rapidly.

12 Claims, 4 Drawing Sheets

SYSTEM AND METHOD OF PREVENTING FRAUDULENT CALL TRANSFERS IN A RADIO TELECOMMUNICATIONS NETWORK

BACKGROUND OF THE INVENTION

1. Technical Field of the Invention

This invention relates to radio telecommunication systems and, more particularly, to a system a method of preventing fraudulent call transfers by disabling a mobile telephone's immediate call transfer feature when certain conditions are met.

2. Description of Related Art

Existing radio telecommunications networks offer a subscriber several call-transfer features. Such features may include, for example, Transfer-on-Busy (TRB), Transfer-on-No-Answer (TRN), and Call Transfer Immediate (CTR). When utilizing the CTR feature, a subscriber programs a forward-to number into the home location register (HLR) associated with his mobile telephone. Thereafter, calls to the subscriber's SNB (subscriber number) are immediately transferred to the programed transfer-to number, regardless of the status of the subscriber's mobile telephone.

While the CTR feature may be a convenience for many subscribers, it also poses a threat of fraudulent use. Typically, a fraudulent user clones the legitimate subscriber's mobile telephone, including the electronic serial number (ESN) and mobile identification number (MIN). Thereafter, the cloned telephone appears to the network to be the subscriber's legitimate telephone. The fraudulent user then utilizes the CTR feature to sell long distance service to other fraudulent users. This can be done in the following manner:

(1) Fraudulent User No. 1 (in City A) clones the mobile telephone of a legitimate subscriber who subscribes to the CTR feature;

(2) Fraudulent User No. 2, who is in the local calling area of Fraudulent User No. 1, wants to call a long distance telephone number in City B;

(3) Fraudulent User No. 1 programs the telephone number in City B as the forward-to number for the CTR feature in the local HLR;

(4) Fraudulent User No. 2 then makes a local call to Fraudulent User No. 1 using the SNB of the cloned mobile telephone;

(5) Since the CTR feature is activated, the call is immediately forwarded to the long distance number in City B, and the legitimate subscriber is billed for the long distance charges; and (6) Fraudulent User No. 1 may then program another long distance telephone number as the forward-to number for the CTR feature in the local HLR, and sell the long distance service to mother fraudulent user. Once again, the legitimate subscriber is billed for the long distance charges.

There are no known prior teachings of a solution to the aforementioned deficiency and shortcoming such as that disclosed herein.

In order to overcome the disadvantage of existing solutions, it would be advantageous to have a system and method of preventing fraudulent call transfers by disabling a mobile telephone's immediate call transfer feature when certain conditions are met. The present intention provides such a system and method.

SUMMARY OF THE INVENTION

In one aspect, the present invention is a system in a radio telecommunications network for preventing fraudulent call transfer by selectively disabling a call transfer immediate (CTR) feature. The system includes a database of subscriber information which includes information relating to each subscriber's activated features and transfer-to numbers. The system also includes feature logic connected to the database for performing functions related to the activated features and for denying services related to features that are not activated, and CTR-disable logic connected to the database and to the feature logic for disabling the CTR feature when conditions indicative of fraudulent usage are detected.

In another aspect, the present invention is a method in a radio telecommunications network of preventing fraudulent transfers by selectively disabling a call transfer immediate (CTR) feature. The method includes the steps of storing in a database, a list of approved transfer-to telephone numbers, and receiving a CTR call transfer request which includes a programmed transfer-to telephone number from a mobile telephone of a subscriber who subscribes to tie CTR feature. The method also includes determining whether the programmed transfer-to telephone number is on the list of approved transfer-to telephone numbers, allowing the received CTR call transfer request upon determining that the programed transfer-to telephone number is on the list of approved transfer-to telephone numbers, and disabling the CTR feature upon determining that the programmed transfer-to telephone number is not on the list of approved transfer-to telephone numbers.

In yet another aspect, the present invention is a method in a radio telecommunications network of preventing fraudulent call transfers by selectively disabling a call transfer immediate (CTR) feature, that includes the steps of receiving a CTR call transfer request from a mobile telephone of a subscriber who subscribes to the CTR feature, starting a CTR timer, and incrementing a CTR counter. This is followed by determining whether the number of CTR call transfer requests exceeds a predetermined threshold number of requests, and allowing the received CTR call transfer request upon determining that the number of CTR call transfer requests does not exceed the predetermined threshold number of requests. If it is determined that the number of CTR call transfer requests exceeds the predetermined threshold number of requests, the method determines whether a time period threshold has been exceeded. This is followed by allowing the received CTR call transfer request upon determining that the time period threshold has been exceeded, and restricting or disabling the CTR feature upon determining that the time period threshold has not been exceeded. In addition, if two successive CTR call transfer requests are received in too short a time, the CTR feature may be restricted or disabled.

BRIEF DESCRIPTION OF THE DRAWINGS

The invention will be better understood and its numerous objects and advantages will become moire apparent to those skilled in the art by reference to the following drawing, in conjunction with the accompanying specification, in which.

DETAILED DESCRIPTION OF EMBODIMENTS

Figure 1:
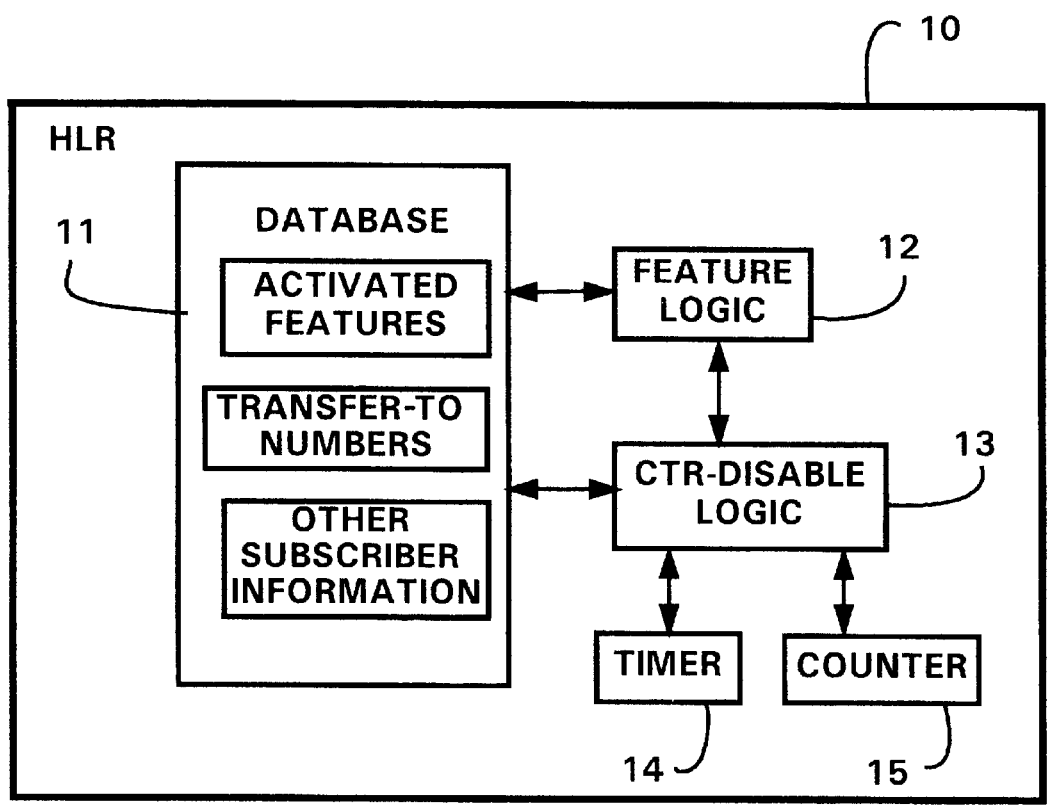
FIG. 1 is a bock diagram of a home location register (HLR) that has been modified to disable the call transfer immediate (CTR) feature in accordance with the teachings of the preset invention.

FIG. 1 is a block diagram of a home location register (HLR) 10 that has been modified to disable the call transfer immediate (CTR) feature in accordance with the teachings of the present invention. The HLR 10 includes a database 11 of subscriber information. The database includes information regarding which features are activated for each subscriber, a record of transfer-to numbers for each subscriber subscribing to a call-transfer feature, and other subscriber information. Internal feature logic 12 in the HLR then performs the necessary steps to cay out the functions related to the activated features, or to deny services related to features that are not activated, or are temporarily disabled.

When the CTR feature is activated, transfer-to numbers may be programmed into the HLR database by the subscriber. Thereafter, calls to the subscriber's SNB are immediately transferred by the HLR feature logic 12 to the programmed transfer-to number, regardless of the stats of the subscriber's mobile telephone.

The present invention adds additional logic to the HLR in the form of CTR-disable logic 13. The CTR-disable logic 13 functions to restrict or disable the CTR feature when certain conditions, indicative of fraudulent usage, are detected. For example, the CTR-disable logic may restrict or disable the CTR feature if the number of CTR transfers within a predetermined period of time exceeds a predetermined threshold programmed into the logic. Likewise, the CTR feature may be restricted or disabled if the time duration between successive CTR transfers is less than a predetermined time duration threshold programmed into the logic. Also, the CTR-disable logic 13 may disable the CTR feature if someone attempts to pro a restricted telephone number such as an overseas or international telephone number as the forward-to number. The CTR-disable logic 13 is completely automatic, and requires no operator invention other than setting threshold values.

The CTR-disable logic 13 operates in conjunction with a timer 14 that determines the time periods between CTR transfer attempts. The output of the timer 14 is compared to the predetermined time duration threshold. A counter 15 counts the number of CTR transfers. The CTR-disable logic 13 takes inputs from the timer 14 and the counter 15 and determines whether or not the number of transfers within a predetermined period of time exceeds the predetermined threshold. In addition to analyzing the total number of CTR call transfer requests over a predetermined period of time, the CTR-disable logic also utilizes the timer 14 and counter 15 to determine whether any two successive transfer requests occur too rapidly. In either case, if the transfers requests fall outside of allowable parameters, the CTR-disable logic then operates to restrict or disable the CTR feature.

Various alarm Revels may be generated and provided to the system operator, depending upon the degree to which the threshold values are exceeded. As a result of achieving different alarm levels, the HLR may take certain actions to restrict CTR usage. For example, at one level, the subscriber may be required to input a persons identification number (PIN) when programming a CTR forward-to number. At other Revels, the HLR may (for example):

(1) Bar CTR transfers completely if a second threshold level is exceeded;

(2) Bar CTR transfers to certain destinations; or (3) Allow only local CTR transfers .

This list is not exhaustive, an other restrictive measures are possible and are with the scope an teachings of the present invention.

Figure 2:
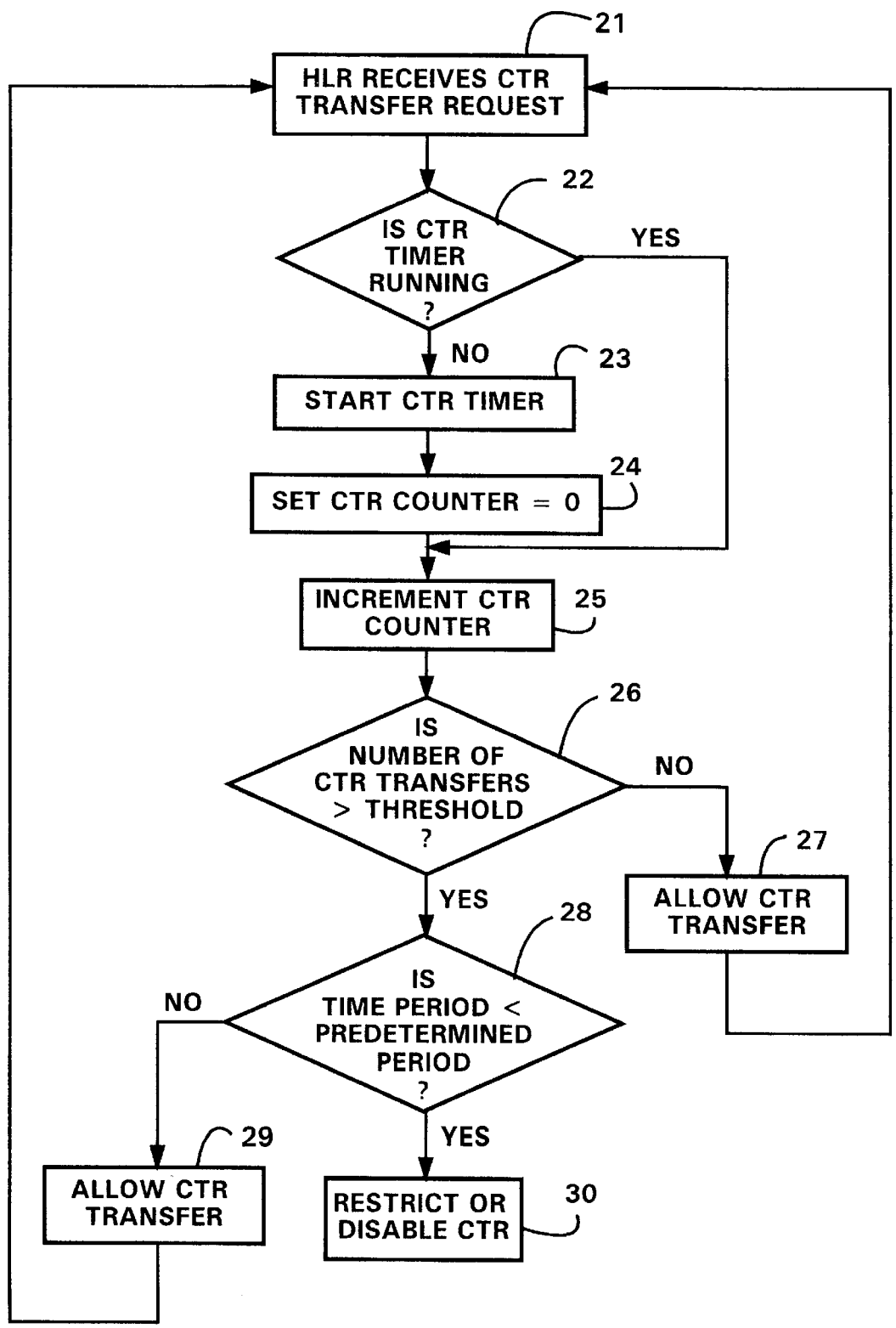
FIG. 2 is a flow chart illustrating the steps involved in a first embodiment of the method of the present invention.

FIG. 2 is a flow chart illustrating the steps involved in the preferred embodiment of the method of he present invention. The method begins at step 21 where the HLR receives a CTR call transfer request from the mobile telephone of a subscriber who subscribes to the CTR feature and has programmed a transfer-to number in the HLR database 11. At step 22, it is determined whether or not the CTR timer 14 is running. If not, the HLR then starts the CTR timer 14 at step 23. The method them moves to step 24 where the CTR, counter 15 is set to zero (0). At step 25, the CTR counter 15 is incremented. If it is determined at step 22 that the CTR times is already running, the method moves directly to step 25.

At step 26, it is determined whether or not the number of CTR transfer requests exceeds a predetermined threshold. If sot, the CTR transfer is allowed at step 27. The method then returns to step 21 where the HLR waits for another CTR call transfer request to be received.

IF, however, it is determined at step 26 that the number of CTR transfer requests exceeds the predetermined threshold, then the method moves to step 28 where it is determined whether or not the elapsed time period is less than a predetermined time period threshold. If not i.e. the time period threshold has been exceeded, then the method moves to step 29 where the CTR call transfer is allowed. If it is determined at 28 that the elapsed time period is less than the predetermined time period threshold, i.e. the time period threshold has not been exceeded, then the method moves to step 30 where the CTR-disable logic 13 restricts or disables the CTR feature.

Figure 3:
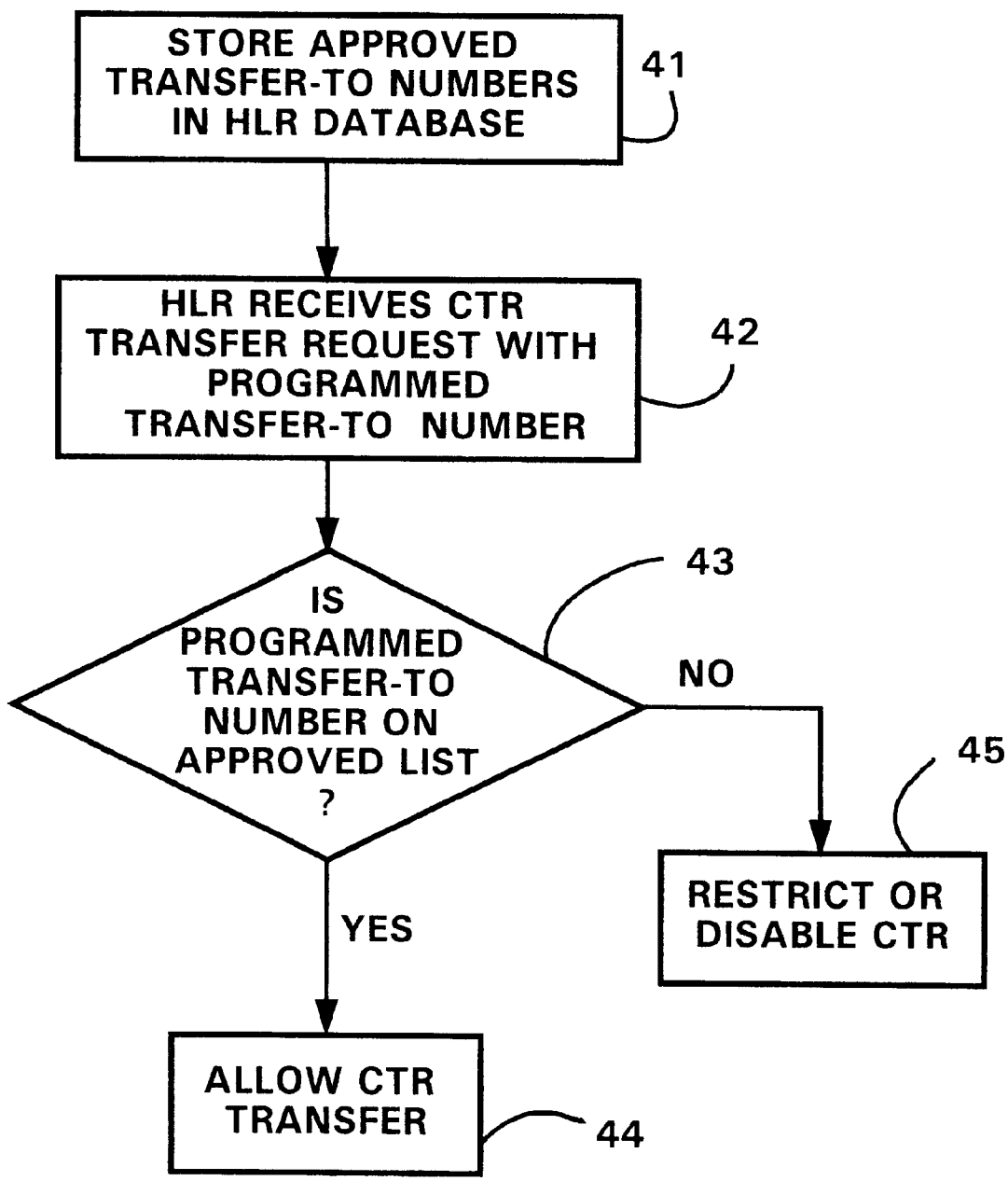
FIG. 3 is a flow chart illustrating the steps involved in a second embodiment of the method of the present invention.

FIG. 3 is a flow chart illustrating the steps involved in a second embodiment of the method of the present invention. This embodiment illustrates a different level of protection that can be implemented in the present invention, and allows CTR transfers only to approved telephone numbers. At step 41, a list of approved transfer-to telephone numbers is stored in the database 11 of the HLR 10. At 42, the HLR receives a CTR call transfer request from the mobile telephone of a subscriber who subscribes to the CTR feature. The CTR call transfers request includes a programmed transfer-to telephone number. At 43, the method determines whether or not the programed transfer-to telephone number is on the approved list stored in the HLR database 11. If the programmed transfer-to telephone number is on the approved list, the method moves to step 44 and allows the CTR call transfer. If the programmed transfer-to telephone number is not on the approved list, the method moves to step 45 and either restricts or disables the CTR feature.

Figure 4:
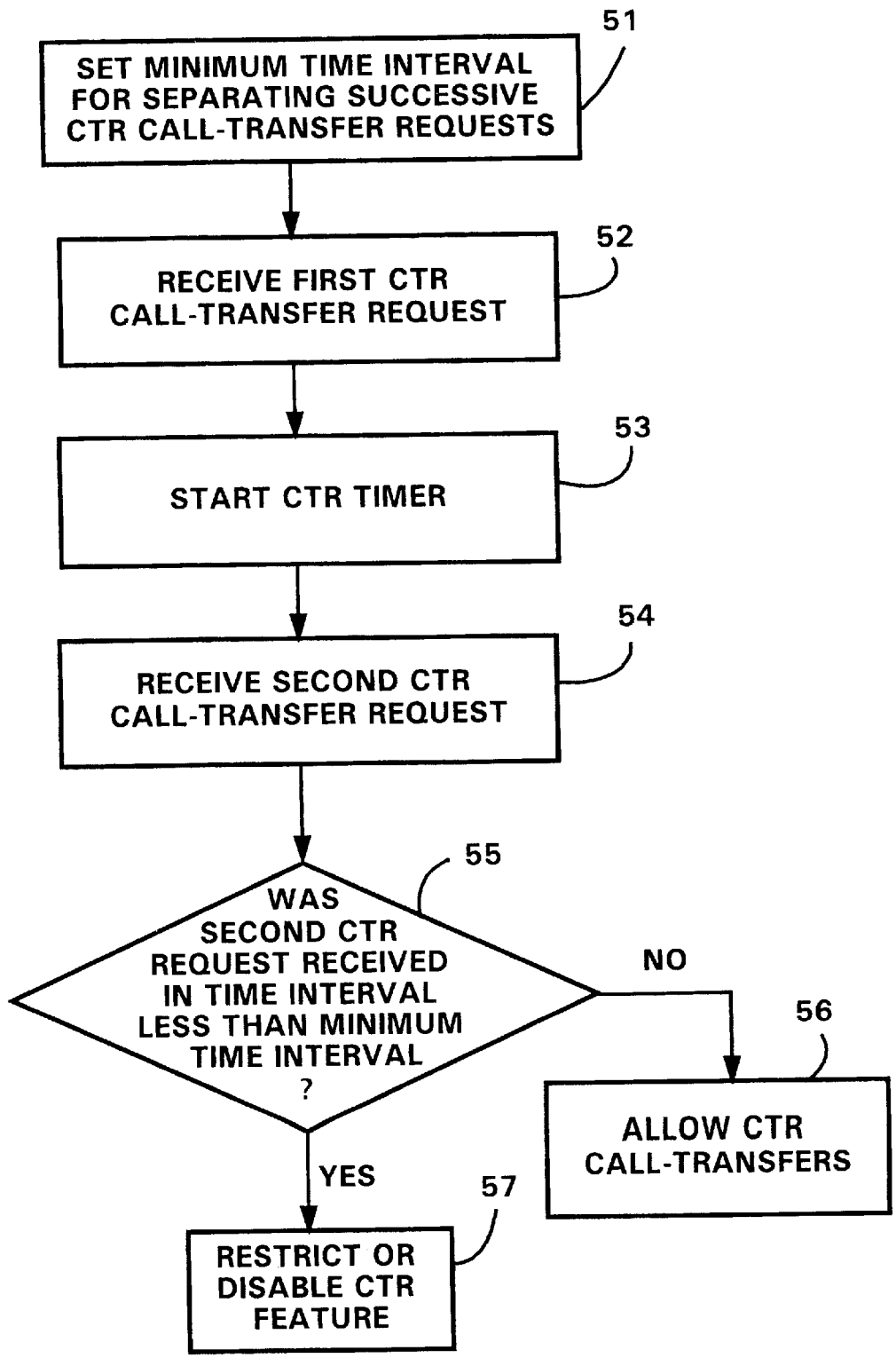
FIG. 4 is a flow chart illustrating the steps involved in a third embodiment of the method of the present invention.

FIG. 4 is a flow chart illustrating the steps involved in a third embodiment of the method of the present invention. At step 51, a network operator sets a minimum time interval for separating two successive CTR call-transfer requests. At step 52, a first CTR call-transfer request is received from a mobile telephone of a subscriber who subscribes to the CTR feature. At step 53, the CTR timer 14 is started. At step 54, a second CTR call transfer request is received from the mobile telephone of to the subscriber who subscribes to the CTR feature. The CTR-disable logic 13 then determines whether or not the second CTR call-transfer request was received in a time interval less than the mum time interval set by the network operator. If the time interval between the first and second CTR call-transfer requests was greater than the minimum time interval, the method moves to step 56 and allows the CTR call transfers. If, however, the time interval between the first and second CTR call-transfer requests was less than the minimum time interval, the method moves to step 57 and restricts or disables the CTR feature.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a radio telecommunications network having a home location register (HLR), a system for preventing fraudulent call transfers by selectively disabling a call transfer immediate (CTR) feature, said system comprising:

a database of subscriber information in the HLR, said database including information relating to each subscriber's activated features and transfer-to numbers;

feature logic in the HLR connected to said database for performing functions related to said activated features and for denying services related to features that are not activated; and CTR-disable logic in the HLR connected to said database and to said feature logic for disabling said CTR feature when conditions indicative of fraudulent call transfers are detected.

2. In a radio telecommunications network having a home location register (HLR), a system for preventing fraudulent call transfers by selectively disabling a call transfer immediate (CTR) feature, said system comprising:

a database of subscriber information in the HLR said database including information relating to each subscriber's activated features and transfer-to numbers;

feature logic in the HLR connected to said database for performing functions related to said activated features and for denying services related to features that are not activated;

CTR-disable logic in the HLR connected to said database and to said feature logic for disabling said CTR feature when conditions indicative of fraudulent call transfers are detected;

a CTR timer connected to said CTR-disable logic; and a CTR counter connected to said CTR-disable logic for counting CTR call-transfer requests.

3. The system for preventing fraudulent call transfers of claim 2 further comprising means for setting a minimum time interval for separating two successive CTR call-transfer requests.

4. The system for preventing fraudulent call transfers of claim 3 further comprising means for determining whether any two successive CTR call-transfer requests occur in a time interval less than said minimum time interval.

5. The system for preventing fraudulent call transfers of claim 2 further comprising:

means for setting a predetermined threshold number of CTR call transfers; and means for setting a predetermined time period, during which the number of CTR call transfers is counted by said CTR counter.

6. The system for preventing fraudulent call transfers of claim 5 wherein CTR-disable logic includes means for determining whether said predetermined threshold number of CTR call transfers is exceeded during said predetermined time period.

7. The system for preventing fraudulent call transfers of claim 1 wherein said CTR-disable logic includes means for disabling said CTR feature when a restricted telephone number is programmed as a transfer-to telephone number.

8. The system for preventing fraudulent call transfers of claim 1 wherein said CTR-disable logic includes means for restricting said CTR feature when conditions indicative of fraudulent usage are detected.

9. In a radio telecommunications network, a method of preventing fraudulent call transfers by selectively disabling a call transfer immediate (CTR) feature, said method comprising the steps of:

storing in a database, a list of approved transfer-to telephone numbers;

receiving a CTR call transfer request from a mobile telephone of a subscriber who subscribes to the CTR feature, said CTR call transfer request including a programmed transfer-to telephone number;

determining whether said programmed transfer-to telephone number is on said list of approved transfer-to telephone numbers;

allowing the received CTR call transfer request upon determining that said programmed transfer-to telephone number is on said list of approved transfer-to telephone numbers; and disabling the CTR feature upon determining that said programmed transfer-to telephone number is not on said list of approved transfer-to telephone numbers.

10. In a radio telecommunications network having a home location register (HLR), a method of preventing fraudulent call transfers by selectively disabling a call transfer immediate (CTR) feature, said method comprising the steps of:

receiving a CTR call transfer request form a mobile telephone of a subscriber who subscribes to the CTR feature;

starting a CTR timer in the HLR;

incrementing a CTR, counter in the HLR;

determining the HLR whether the number of CTR call transfer requests exceeds a predetermined threshold number of requests;

allowing the received CTR call transfer request upon determining that said number of CTR call transfer requests does not exceed the predetermined threshold number of requests;

determining in the HLR, whether a time period threshold has been exceeded, upon determining that the number of CTR call transfer requests exceeds the predetermined threshold number of requests;

allowing the received CTR call transfer request upon determining that said time period threshold has been exceeded; and disabling the CTR feature upon determining that said time period threshold has not been exceeded.

11. In a radio telecommunications network having a home location register (HLR) which includes a call transfer immediate (CTR) feature, CTR-disable logic, a CTR timer, and a CTR counter, a method of preventing fraudulent call transfers by selectively restricting said CTR feature, said method comprising the steps of:

setting a minimum time interval for separating two successive CTR call-transfer requests;

receiving a first CTR call-transfer request from a mobile telephone of a subscriber who subscribes to the CTR feature;

starting said CTR timer in the HLR;

receiving a second CTR call-transfer request from said mobile telephone;

determining, in the CTR-disable logic in the HLR whether said second CTR call-transfer request was received in a time interval less than said minimum time interval;

allowing said second CTR call-transfer request upon determining that said second CTR call-transfer request was received in a time interval greater than said minimum time interval; and restricting the CTR feature upon determining that said second CTR call-transfer request was received in a time interval less than said minimum time interval.

12. The method of preventing fraudulent call transfers of claim 11 wherein said step of restricting the CTR feature upon determining that said second CTR call-transfer request occurred in a time interval less than said minimum time interval includes disabling said CTR feature.

* * * * *